US006930898B2

(12) United States Patent
Jeon et al.

(10) Patent No.: US 6,930,898 B2
(45) Date of Patent: Aug. 16, 2005

(54) SINGLE-STAGE BACKLIGHT INVERTER AND METHOD FOR DRIVING THE SAME

(75) Inventors: Hyoung Jun Jeon, Kyungki-do (KR); Byoung Own Min, Kyungki-do (KR); Hyun Jin Kim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/795,341

(22) Filed: Mar. 9, 2004

(65) Prior Publication Data

US 2005/0146907 A1 Jul. 7, 2005

(30) Foreign Application Priority Data

Jan. 5, 2004 (JP) ...................... 10-2004-0000232

(51) Int. Cl.[7] .......................................... H02M 7/5387
(52) U.S. Cl. ........................................ 363/98; 363/132
(58) Field of Search ............................. 363/95, 97, 98, 363/131, 132

(56) References Cited

U.S. PATENT DOCUMENTS 5,666,279 A * 9/1997 Takehara et al. .............. 363/95
5,818,709 A * 10/1998 Takehara ..................... 363/95
6,690,591 B2 * 2/2004 Min ............................ 363/97

* cited by examiner

*Primary Examiner*—Adolf Berhane
(74) *Attorney, Agent, or Firm*—Lowe Hauptman & Berner, LLP

(57) ABSTRACT

Disclosed herein are a single-stage backlight inverter and a method for driving the same. The single-stage backlight inverter comprises a main oscillator for generating a predetermined triangle-wave oscillation signal, a predetermined clock signal and an inverted clock signal, and an output drive controller responsive to the triangle-wave oscillation signal, clock signal and inverted clock signal from the main oscillator and first and second reference voltages set therein. The second reference voltage has a level set to an intermediate level of the triangle-wave oscillation signal. The output drive controller is adapted to generate a first drive control signal and generate a second drive control signal. The inverter further comprises a first output unit for outputting a pair of first switching signals in response to the first drive control signal, and a second output unit for outputting a pair of second switching signals in response to the second drive control signal.

8 Claims, 7 Drawing Sheets

SINGLE-STAGE BACKLIGHT INVERTER AND METHOD FOR DRIVING THE SAME

BACKGROUND OF THE INVENTION

1. Field of the Invention

The present invention relates to a single-stage backlight inverter for controlling driving of a cold cathode fluorescent lamp (CCFL) for a thin film transistor-liquid crystal display (TFT-LCD) panel, and more particularly to a single-stage backlight inverter and a method for driving the same, wherein switching signals to power switches for driving of a CCFL are phase-shifted to realize zero-voltage switching capable of adjusting the ratio of enable times of the power switches, thereby making it possible to reduce stresses on the power switches, readily control driving of the lamp and provide a switching control circuit in the form of an integrated circuit (IC) to simplify the configuration thereof.

2. Description of the Related Art

CCFLs for TFT-LCD panels are generally operated at low current, resulting in advantages such as low power consumption, low heat, high brightness and long life. In this connection, the CCFLs have recently been used in various display devices such as a backlight unit of a computer monitor, for example, a TFT-LCD, and a display panel of a printer. A high alternating current (AC) voltage of 1 to 2 kV is required to light such a CCFL, and an inverter is utilized to provide such a high AC voltage.

The inverter can be generally classified into two types, a single type (or a single-stage type) where one transformer is driven by one driver and a double type (or a two-stage type) where two transformers are driven in tandem by one driver.

FIG. 1 is a block diagram showing the configuration of a conventional backlight inverter.

The conventional backlight inverter shown in FIG. 1 is a two-stage backlight inverter and comprises a switching device 11 for converting a direct current (DC) voltage of about 5 to 30V into a square-wave voltage in response to a pulse width modulation (PWM) signal, a rectifier 12 for rectifying an output voltage from the switching device 11 by half wave, a transformer driver 13 for performing a self-oscillating function to convert an output voltage from the rectifier 12 into an AC voltage, a transformer device 14 for boosting an output AC voltage from the transformer driver 13 to a voltage level of about 1 to 2 kV necessary to a lamp operation, a lamp 15, such as a CCFL, connected to the transformer device 14 such that it is turned on/off in response to an output voltage from the transformer device 14, a feedback voltage detector 16 for detecting a voltage corresponding to current flowing through the lamp 15, and a dimming controller 17 for generating the PWM signal based on the voltage detected by the feedback voltage detector 16 and providing it to the switching device 11 to adjust a duty cycle of the square-wave voltage. The transformer driver 13 can be of any drive type based on a given circuit configuration.

With the above configuration, the conventional two-stage backlight inverter is adapted to drive the CCFL directly through the self-oscillating circuit to generate the transformer driving AC voltage.

However, the above-mentioned conventional two-stage backlight inverter is disadvantageous in that complex circuits, such as the self-oscillating circuit, a buck converter, etc., are required to apply an AC voltage to the transformer device so as to drive the CCFL, resulting in an increase in application costs of such circuits. Further, an associated control circuit is so complex that it is subject to a limitation in size reduction. This limitation causes difficulty in building it in one IC.

SUMMARY OF THE INVENTION

Therefore, the present invention has been made in view of the above problems, and it is an object of the present invention to provide a single-stage backlight inverter and a method for driving the same, wherein switching signals to power switches for driving of a CCFL are phase-shifted to realize zero-voltage switching capable of adjusting the ratio of enable times of the power switches, thereby making it possible to reduce stresses on the power switches, readily control driving of the lamp and provide a switching control circuit in the form of an IC to simplify the configuration thereof.

In accordance with the present invention, the above and other objects can be accomplished by the provision of a single-stage backlight inverter for driving one lamp through one transformer using a predetermined pulse width modulation (PWM) oscillation signal, comprising: a main oscillator for generating a predetermined triangle-wave oscillation signal, a predetermined clock signal and an inverted clock signal; an output drive controller responsive to the triangle-wave oscillation signal, clock signal and inverted clock signal from the main oscillator and first and second reference voltages set therein, the second reference voltage having a level set to an intermediate level of the triangle-wave oscillation signal, the output drive controller generating a first voltage having a level set to a value between the level of the second reference voltage and a lowest level of the triangle-wave oscillation signal, comparing the generated first voltage with the triangle-wave oscillation signal, generating a first drive control signal in accordance with the comparison result, generating a second voltage having a level set to a value between the level of the second reference voltage and a peak level of the triangle-wave oscillation signal, comparing the generated second voltage with the triangle-wave oscillation signal, and generating a second drive control signal in accordance with the comparison result, the first and second drive control signals having different switching ON times; a first output unit for outputting a pair of first switching signals in response to the first drive control signal from the output drive controller, the first switching signals having a predetermined dead time therebetween; and a second output unit for outputting a pair of second switching signals in response to the second drive control signal from the output drive controller, the second switching signals having a predetermined dead time therebetween.

Preferably, the output drive controller may include: an integrator having an inverting terminal for receiving a voltage detected from the lamp and a non-inverting terminal for receiving the first reference voltage, the integrator integrating the detected voltage to output the first voltage; a comparison circuit having a non-inverting terminal for receiving a PWM dimming voltage and an inverting terminal for receiving the PWM oscillation signal, the comparison circuit comparing the PWM oscillation signal with the PWM dimming voltage; a switch for performing a switching operation for connection/disconnection between an output terminal of the integrator and a ground terminal in response to an output signal from the comparison circuit; a logic driver for generating the first drive control signal in response to the triangle-wave oscillation signal, the second reference voltage, the first voltage from the integrator and the clock signal; and a phase shift driver for generating the second drive control signal in response to the triangle-wave oscillation signal, the second reference voltage, the first voltage from the integrator and the inverted clock signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
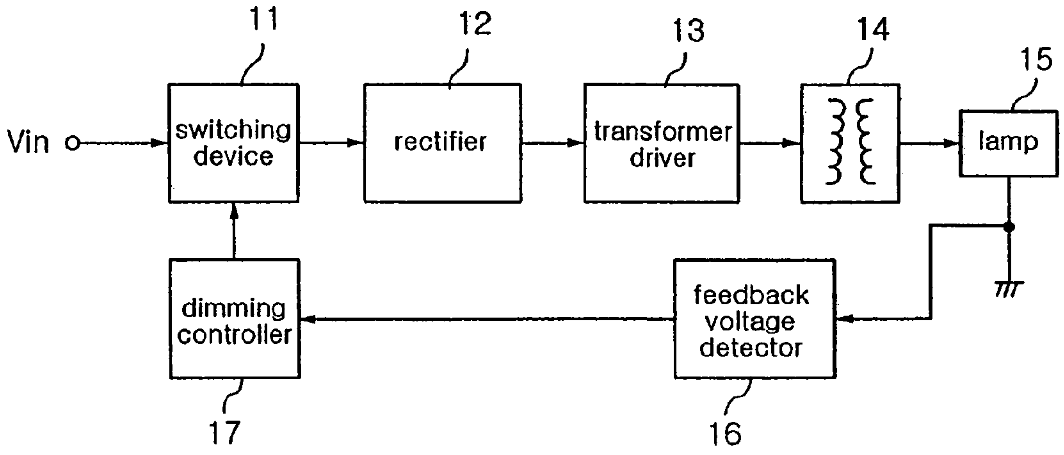
PRIOR ART FIG. 1
FIG. 1 is a block diagram showing the configuration of a conventional backlight inverter.

Now, preferred embodiments of the present invention will be described in detail with reference to the annexed drawings. In the drawings, the same or similar elements are denoted by the same reference numerals even though they are depicted in different drawings.

Figure 2:
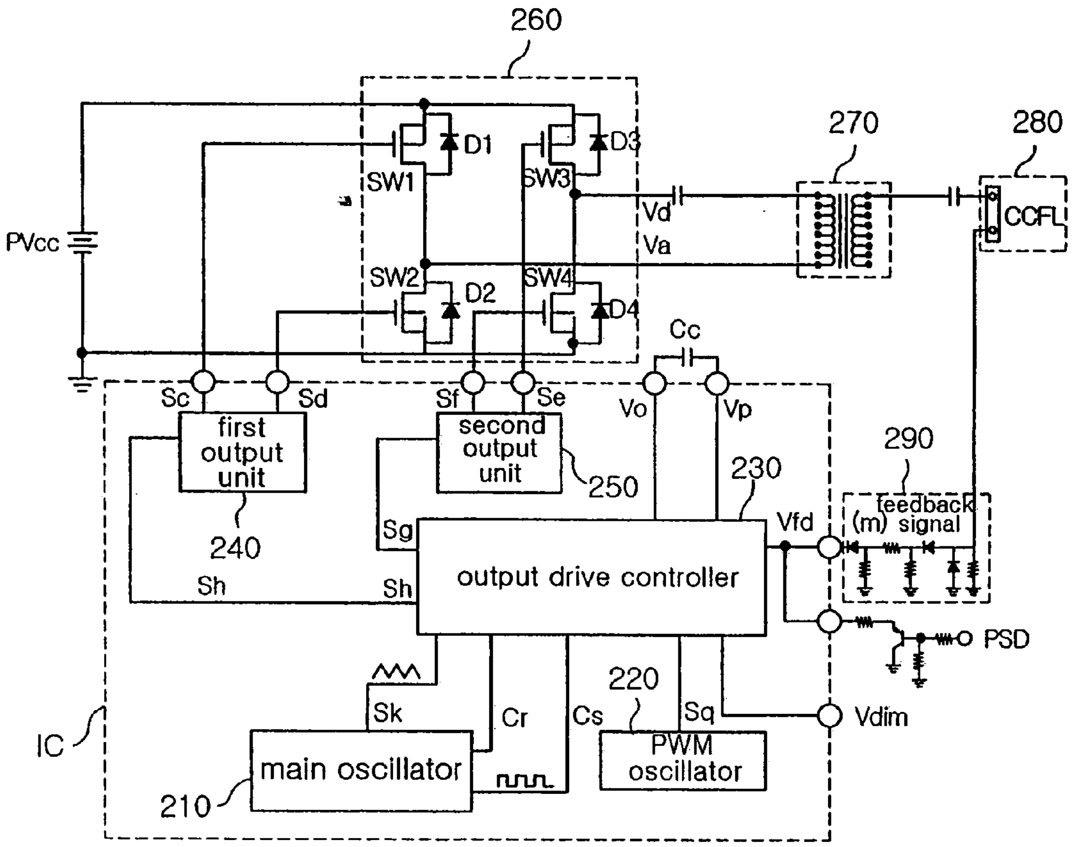
FIG. 2 is a circuit diagram showing the configuration of a single-stage backlight inverter according to the present invention.

FIG. 2 is a circuit diagram showing the configuration of a single-stage backlight inverter according to the present invention.

With reference to FIG. 2, the single-stage backlight inverter according to the present invention is adapted to drive one CCFL 280 by means of one transformer 270 using a predetermined PWM oscillation signal Sq, and comprises a main oscillator 210 for generating a predetermined triangle-wave oscillation signal Sk, a predetermined clock signal Cs and an inverted clock signal Cr, and an output drive controller 230 responsive to the triangle-wave oscillation signal Sk, clock signal Cs and inverted clock signal Cr from the main oscillator 210 and first and second reference voltages Vref1 and Vref2 set therein. The second reference voltage Vref2 has a level set to an intermediate level of the triangle-wave oscillation signal Sk. The output drive controller 230 functions to generate a first voltage Vo having a level set to a value between the level of the second reference voltage Vref2 and a lowest level of the triangle-wave oscillation signal Sk, compare the generated first voltage Vo with the triangle-wave oscillation signal Sk, to generate a first drive control signal Sh in accordance with the comparison result, generate a second voltage 2Vref2-Vo having a level set to a value between the level of the second reference voltage Vref2 and a peak level of the triangle-wave oscillation signal Sk, compare the generated second voltage 2Vref2-Vo with the triangle-wave oscillation signal Sk, and generate a second drive control signal Sg in accordance with the comparison result. The first and second drive control signals Sh and Sg have different switching ON times. The single-stage backlight inverter further comprises a first output unit 240 for outputting a pair of first switching signals Sc and Sd having a predetermined dead time therebetween in response to the first drive control signal Sh from the output drive controller 230, and a second output unit 250 for outputting a pair of second switching signals Sf and Se having a predetermined dead time therebetween in response to the second drive control signal Sg from the output drive controller 230.

The single-stage backlight inverter according to the present invention further comprises a PWM oscillator 220 for generating the predetermined PWM oscillation signal Sq, a switching device 260 for supplying an AC drive signal to the transformer 270 in response to the pair of first switching signals Sc and Sd from the first output unit 240 and the pair of second switching signals Sf and Se from the second output unit 250, and a feedback voltage detector 290 for detecting a voltage Vfd corresponding to current flowing through the lamp 280 and supplying the detected voltage Vfd to the output drive controller 230.

The switching device 260 includes first and second power switches SW1 and SW2 turned on/off in response to the pair of first switching signals Sc and Sd from the first output unit 240 to perform a switching operation, and third and fourth power switches SW3 and SW4 turned on/off in response to the pair of second switching signals Se and Sf from the second output unit 250 to perform a switching operation. The AC drive signal is supplied to the transformer 270 according to the switching operations of the power switches SW1–SW4.

Figure 3:
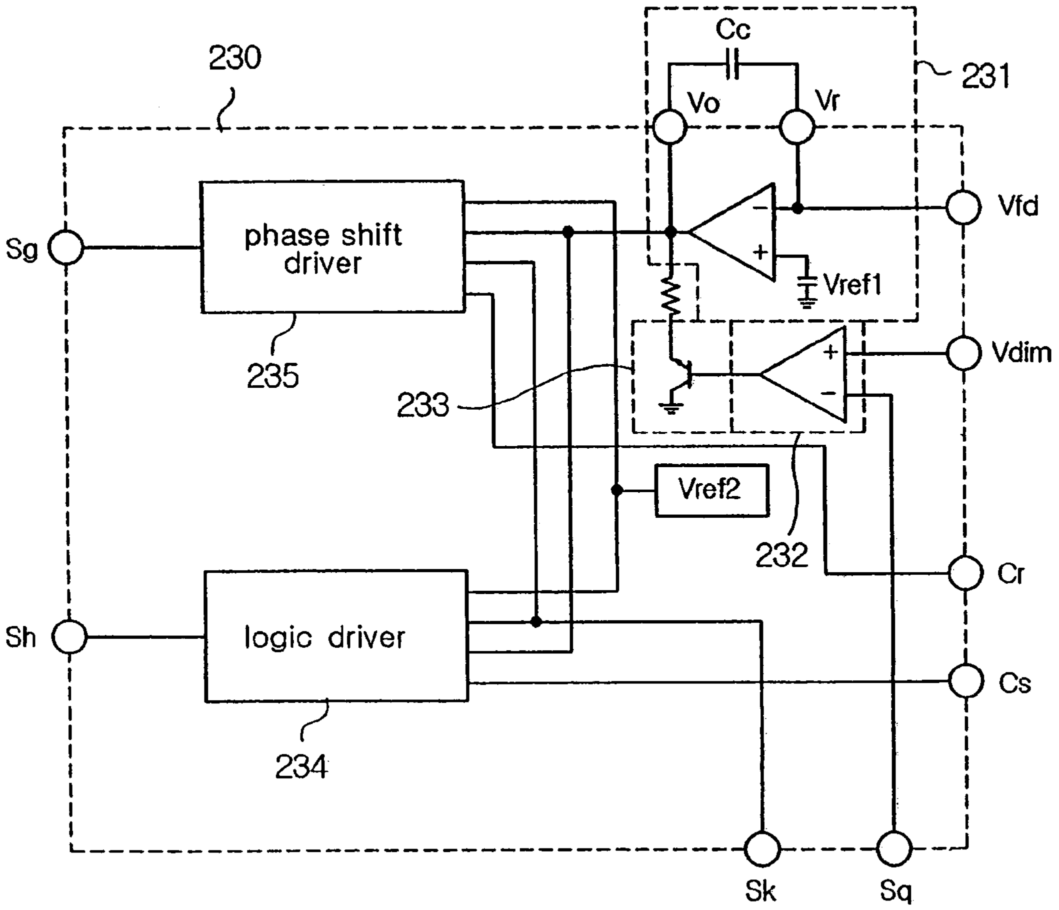
FIG. 3 is a circuit diagram of an output drive controller in FIG. 2.

FIG. 3 is a circuit diagram of the output drive controller 230 in FIG. 2.

With reference to FIG. 3, the output drive controller 230 includes an integrator 231 having an inverting terminal for receiving the voltage Vfd detected from the lamp 280 and a non-inverting terminal for receiving the first reference voltage Vref1. The integrator 231 acts to integrate the detected voltage Vfd to output the first voltage Vo. The output drive controller 230 further includes a comparison circuit 232 having a non-inverting terminal for receiving a PWM dimming voltage Vdim and an inverting terminal for receiving the PWM oscillation signal Sq. The comparison circuit 232 acts to compare the PWM oscillation signal Sq with the PWM dimming voltage Vdim. The output drive controller 230 further includes a switch 233 for performing a switching operation for connection/disconnection between an output terminal of the integrator 231 and a ground terminal in response to an output signal from the comparison circuit 232, a logic driver 234 for generating the first drive control signal Sh in response to the triangle-wave oscillation signal Sk, the second reference voltage Vref2, the first voltage Vo from the integrator 231 and the clock signal Cs, and a phase shift driver 235 for generating the second drive control signal Sg in response to the triangle-wave oscillation signal Sk, the second reference voltage Vref2, the first voltage Vo from the integrator 231 and the inverted clock signal Cr.

The second reference voltage Vref2 has a level set to the intermediate level of the triangle-wave oscillation signal Sk, and the first voltage Vo from the integrator 231 has a level set to an approximately intermediate value between the level of the second reference voltage Vref2 and the lowest level of the triangle-wave oscillation signal Sk.

Figure 4:
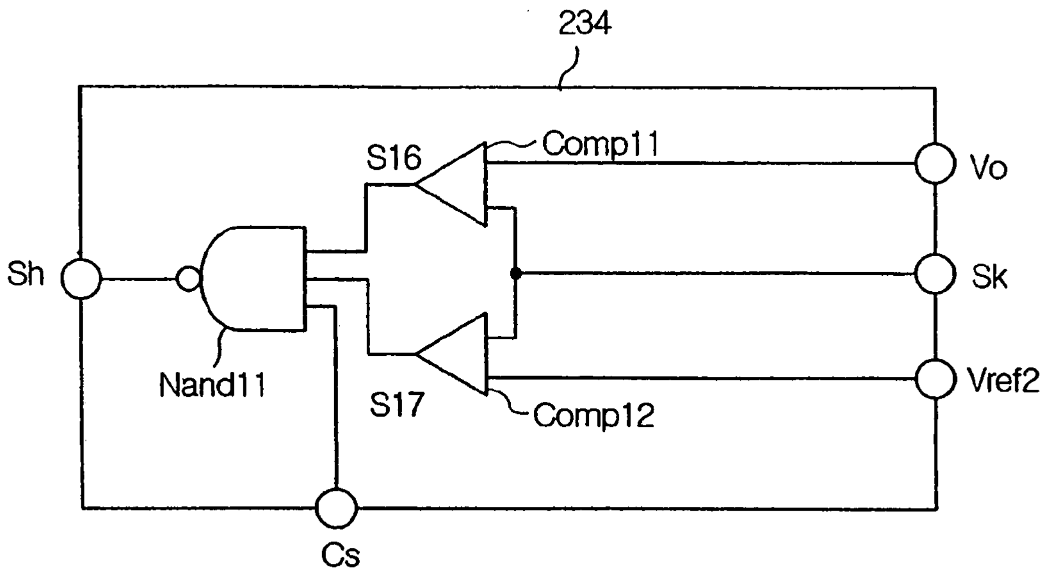
FIG. 4 is a circuit diagram of a logic driver in FIG. 3.

FIG. 4 is a circuit diagram of the logic driver 234 in FIG. 3.

With reference to FIG. 4, the logic driver 234 includes a first comparator Comp11 having an inverting terminal for receiving the triangle-wave oscillation signal Sk and a non-inverting terminal for receiving the first voltage Vo from the integrator 231. The first comparator Comp11 acts to compare the triangle-wave oscillation signal Sk with the first voltage Vo from the integrator 231. The logic driver 234 further includes a second comparator Comp12 having an inverting terminal for receiving the triangle-wave oscillation signal Sk and a non-inverting terminal for receiving the second reference voltage Vref2. The second comparator Comp12 acts to compare the triangle-wave oscillation signal Sk with the second reference voltage Vref2. The logic driver 234 further includes a NAND gate Nand11 for NANDing an output signal from the first comparator Comp11, an output signal from the second comparator Comp12 and the clock signal Cs and outputting the NANDed result as the first drive control signal Sh.

Figure 5:
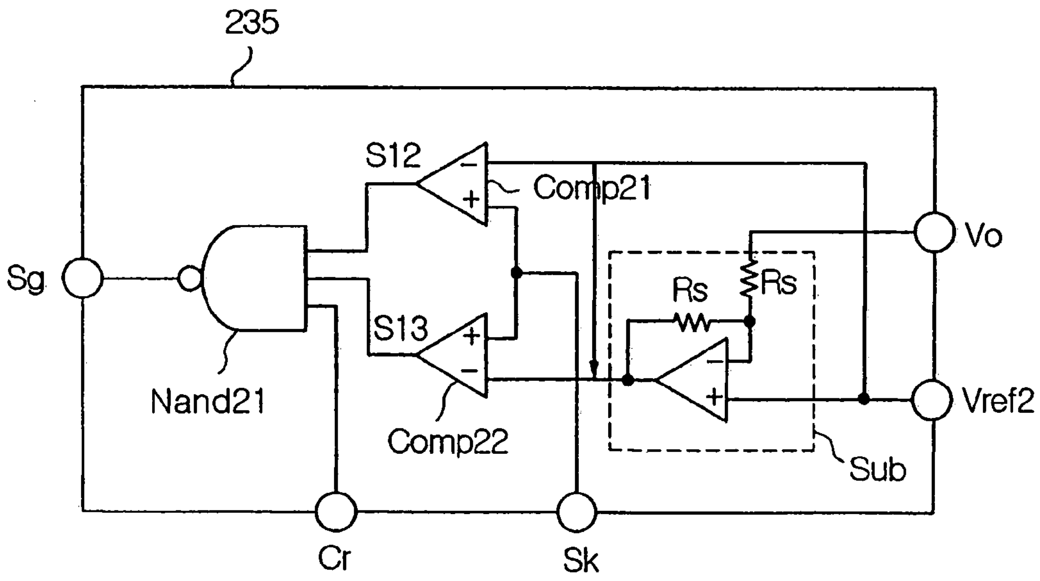
FIG. 5 is a circuit diagram of a phase shift driver in FIG. 3.

FIG. 5 is a circuit diagram of the phase shift driver 235 in FIG. 3.

With reference to FIG. 5, the phase shift driver 235 includes a first comparator Comp21 having a non-inverting terminal for receiving the triangle-wave oscillation signal Sk and an inverting terminal for receiving the second reference voltage Vref2. The first comparator Comp21 acts to compare the triangle-wave oscillation signal Sk with the second reference voltage Vref2. The phase shift driver 235 further includes a subtractor Sub having a non-inverting terminal for receiving the second reference voltage Vref2 and an inverting terminal for receiving the first voltage Vo from the integrator 231. The subtractor Sub acts to subtract the first voltage Vo from the integrator 231 from a voltage 2Vref2 of twice the second reference voltage Vref2 and output the subtracted result as the second voltage 2Vref2-Vo. The phase shift driver 235 further includes a second comparator Comp22 having a non-inverting terminal for receiving the triangle-wave oscillation signal Sk and an inverting terminal for receiving an output signal from the subtractor Sub. The second comparator Comp22 acts to compare the triangle-wave oscillation signal Sk with the output signal from the subtractor Sub. The phase shift driver 235 further includes a NAND gate Nand21 for NANDing an output signal from the first comparator Comp21, an output signal from the second comparator Comp22 and the inverted clock signal Cr and outputting the NANDed result as the second drive control signal Sg.

The second voltage 2Vref2-Vo from the subtractor Sub has a level set to an approximately intermediate value between the level of the second reference voltage Vref2 and the peak level of the triangle-wave oscillation signal Sk. The level of the second voltage 2Vref2-Vo from the subtractor Sub is in symmetrical relation to the level of the first voltage Vo from the integrator 231 about the level of the second reference voltage Vref2.

According to the present invention, the main oscillator 210, PWM oscillator 220, output drive controller 230, first output unit 240 and second output unit 250 as described above can be implemented in one IC.

Figure 6:
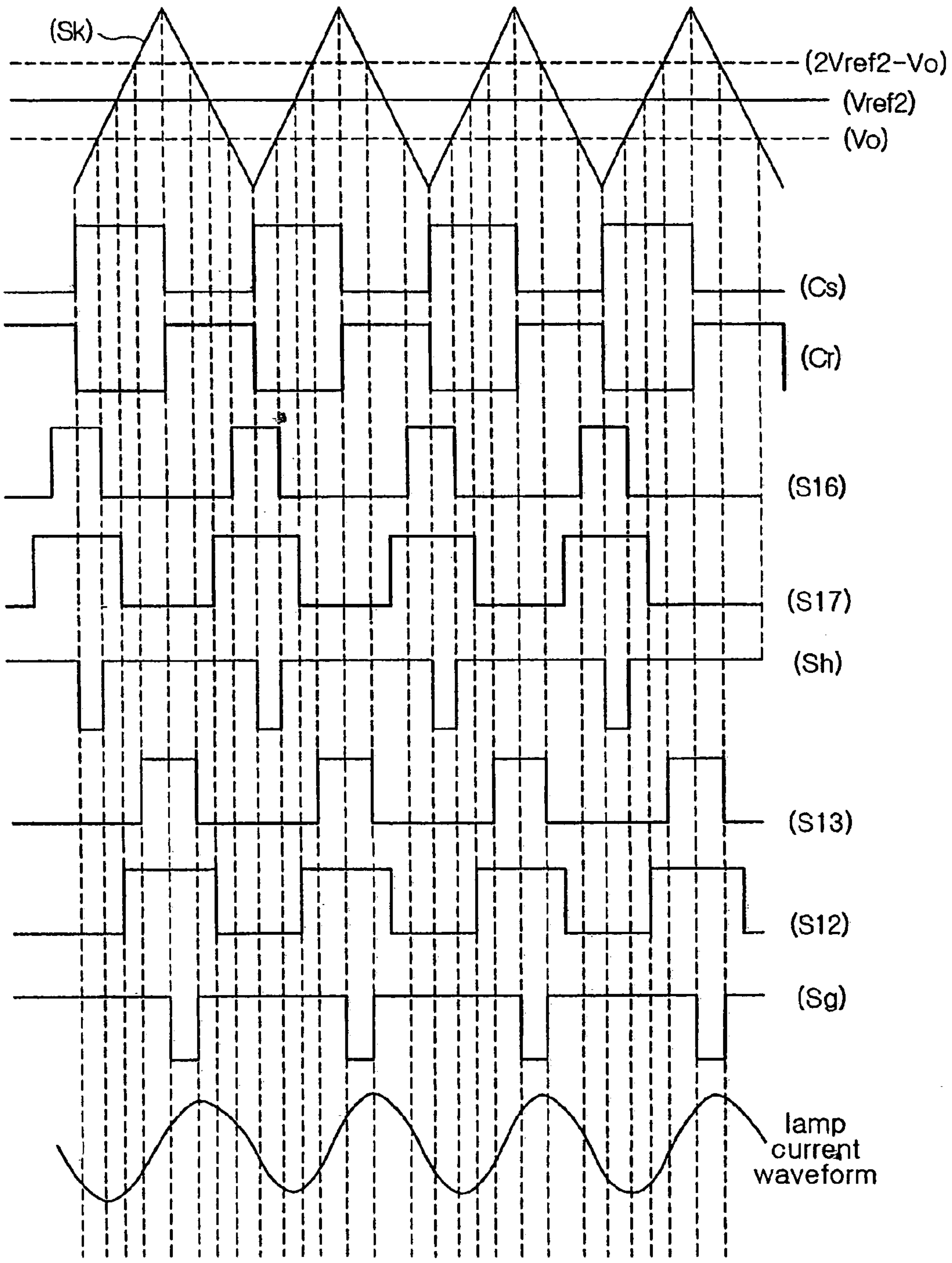
FIG. 6 is a timing chart of main signals in the single-stage backlight inverter according to the present invention.

FIG. 6 is a timing chart of the main signals in the single-stage backlight inverter according to the present invention. In this drawing, Sk is the triangle-wave oscillation signal, Vref2 is the second reference voltage, Vo is the output voltage from the integrator 231, Cs and Cr are the clock signal and the inverted clock signal, respectively, S16 and S17 are the internal signals of the logic driver 234, Sh is the first drive control signal, S12 and S13 are the internal signals of the phase shift driver 235, and Sg is the second drive control signal.

Figure 7:
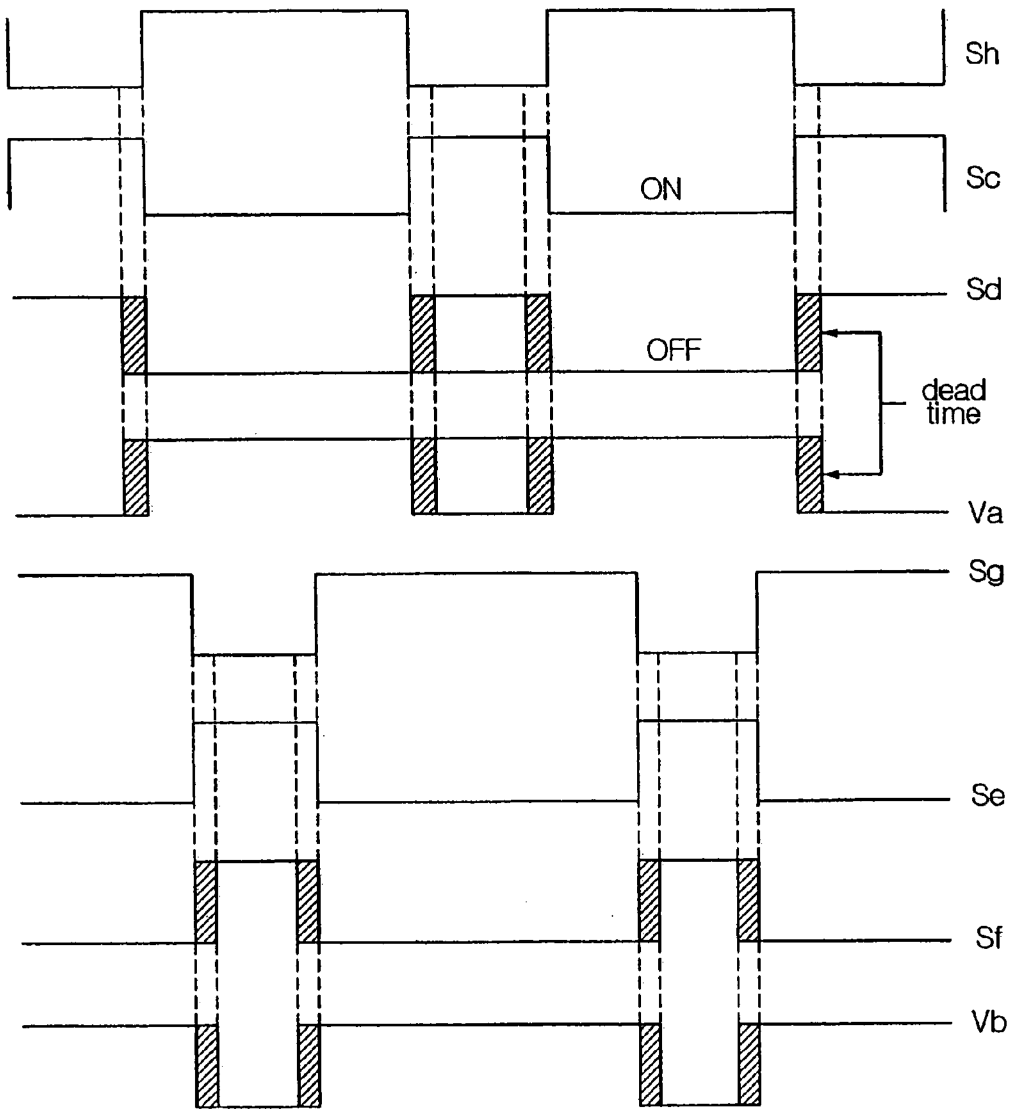
FIG. 7 is a timing chart of switching signals in the single-stage backlight inverter according to the present invention.

FIG. 7 is a timing chart of the switching signals in the single-stage backlight inverter according to the present invention. In this drawing, Sh is the first drive control signal, Sc and Sd are the pair of first switching signals generated on the basis of the first drive control signal Sh, Sg is the second drive control signal, and Se and Sf are the pair of second switching signals generated on the basis of the second drive control signal Sg.

A detailed description will hereinafter be given of the operation of the single-stage backlight inverter with the above-stated construction according to the present invention with reference to the annexed drawings.

The single-stage backlight inverter according to the present invention is adapted to control driving of a CCFL for a TFT-LCD panel. In this inverter, switching signals to power switches for the driving of the CCFL are phase-shifted to realize zero-voltage switching capable of adjusting the ratio of enable times of the power switches, which will hereinafter be described with reference to FIGS. 2 to 8.

Figure 8:
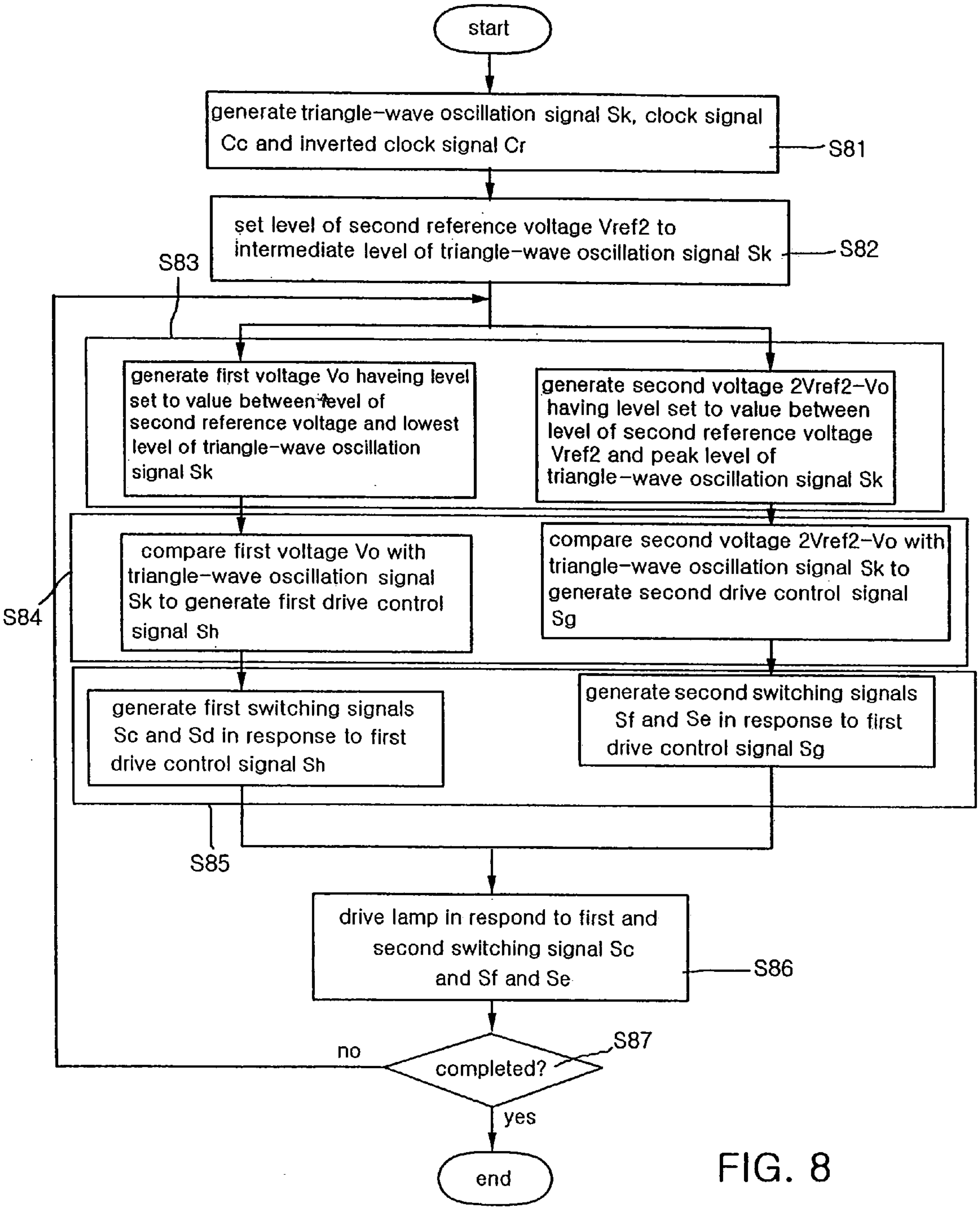
FIG. 8 is a flow chart illustrating a method for driving the single-stage backlight inverter according to the present invention.

With reference to FIGS. 2 and 8, in the single-stage backlight inverter of the present invention, the main oscillator 210 generates the predetermined triangle-wave oscillation signal Sk of about 100 KHz, the predetermined clock signal Cs and the inverted clock signal Cr, and the PWM oscillator 220 generates the predetermined PWM oscillation signal Sq of about 200 Hz (S81).

The output drive controller 230 generates the first drive control signal Sh on the basis of the triangle-wave oscillation signal Sk, the clock signal Cs and the PWM oscillation signal Sq, and the second drive control signal Sg with the switching ON time different from that of the first drive control signal Sh on the basis of the triangle-wave oscillation signal Sk, the inverted clock signal Cr, the PWM oscillation signal Sq, the external PWM dimming voltage Vdim and the detected voltage Vfd, respectively (S82–S84).

The first drive control signal Sh has the switching ON time in any one of the upper or lower phase of the triangle-wave oscillation signal Sk about the intermediate level thereof. The second drive control signal Sg has the switching ON time in the opposite phase to that of the first drive control signal Sh. The PWM oscillation signal Sq and the PWM dimming voltage-Vdim are used to adjust brightness of the CCFL.

With reference to FIGS. 2, 7 and 8, the first output unit 240 outputs the pair of first switching signals Sc and Sd having the predetermined dead time therebetween in response to the first drive control signal Sh from the output drive controller 230, and the second output unit 250 outputs the pair of second switching signals Sf and Se having the predetermined dead time therebetween in response to the second drive control signal Sg from the output drive controller 230 (S85).

The switching device 260 supplies the AC drive signal to the transformer 270 in response to the pair of first switching signals Sc and Sd from the first output unit 240 and the pair of second switching signals Sf and Se from the second output unit 250 (S86 and S87).

A more detailed description will hereinafter be given of the switching device 260 with reference to FIG. 2. The switching device 260 is of an H-bridge type including the first and second power switches SW1 and SW2 and the third and fourth power switches SW3 and SW4. The first and second power switches SW1 and SW2 are turned on/off in response to the pair of first switching signals Sc and Sd from the first output unit 240 to perform a switching operation, and the third and fourth power switches SW3 and SW4 are turned on/off in response to the pair of second switching signals Se and Sf from the second output unit 250 to perform a switching operation. That is, the power switches SW1 and SW4 of the switching device 260 are simultaneously turned on to allow current to flow in any one direction, or the power switches SW2 and SW3 of the switching device 260 are simultaneously turned on to allow current to flow in the other direction, thereby causing the AC drive signal to be supplied to the transformer 270.

The transformer 270 boosts the AC drive signal and supplies the boosted signal to the lamp 280. As a result, current flows through the lamp 280 to operate it.

A proper amount of current flows through the lamp 280 while it is in operation. The feedback voltage detector 290 detects the voltage Vfd corresponding to the current flowing through the lamp 280 and supplies the detected voltage Vfd to the output drive controller 230.

The output drive controller 230 is operated in the below manner.

With reference to FIGS. 2 to 8, the voltage Vfd fed back from the CCFL 280 is detected by the feedback voltage detector 290 and then applied to the output drive controller 230. The integrator 231 of the output drive controller 230 receives the detected voltage Vfd at its inverting terminal and the internally set first reference voltage Vref1 at its non-inverting terminal and integrates the detected voltage Vfd to output the first voltage Vo. The output voltage Vo from the integrator 231 has a level set to be lower than that of the second reference voltage Vref2, as shown in FIG. 6. It will be understood that it is possible to adjust the amount of current to be integrated in the integrator 231 through a capacitor Cc.

The comparison circuit 232 of the output drive controller 230 receives the PWM dimming voltage Vdim at its non-inverting terminal and the PWM oscillation signal Sq at its inverting terminal and compares the PWM oscillation signal Sq with the PWM dimming voltage Vdim. The switch 233 of the output drive controller 230 performs a switching operation for connection/disconnection between the output terminal of the integrator 231 and the ground terminal in response to the output signal from the comparison circuit 232 to adjust the amount of feedback. That is, the switch 233 acts to adjust the amount of the detected feedback voltage in the logic driver 234.

For example, since the output voltage from the integrator 231 is adjustable by the PWM dimming voltage Vdim, it may be adjusted to a low state through the PWM dimming voltage Vdim.

Thereafter, the logic driver 234 of the output drive controller 230 generates the first drive control signal Sh as shown in FIG. 6 on the basis of the triangle-wave oscillation signal Sk, the internally set second reference voltage Vref2, the first voltage Vo from the integrator 231 and the clock signal Cs.

Also, the phase shift driver 235 of the output drive controller 230 generates the second drive control signal Sg as shown in FIG. 6 on the basis of the triangle-wave oscillation signal Sk, the second reference voltage Vref2, the first voltage Vo from the integrator 231 and the inverted clock signal Cr.

With reference to FIG. 6, the triangle-wave oscillation signal Sk has a constant level of about 100 KHz, and the internally set second reference voltage Vref2 has a level set to the intermediate level of the triangle-wave oscillation signal Sk. The first drive control signal Sh is generated in a phase of the triangle-wave oscillation signal Sk where the triangle-wave oscillation signal Sk is lower in level than the second reference voltage Vref2, and the second drive control signal Sg is generated in a phase of the triangle-wave oscillation signal Sk where the triangle-wave oscillation signal Sk is higher in level than the second reference voltage Vref2. As a result, the first drive control signal Sh and the second drive control signal Sg are generated in different phases.

Next, the operation of the logic driver 234 will be described with reference to FIGS. 4 and 6.

With reference to FIG. 4, first, the first comparator Comp11 receives the triangle-wave oscillation signal Sk at its inverting terminal and the first voltage Vo from the integrator 231 at its non-inverting terminal and compares the triangle-wave oscillation signal Sk with the first voltage Vo from the integrator 231 to output the signal S16 as shown in FIG. 6. The second comparator Comp12 of the logic driver 234 receives the triangle-wave oscillation signal Sk at its inverting terminal and the second reference voltage Vref2 at its non-inverting terminal and compares the triangle-wave oscillation signal Sk with the second reference voltage Vref2 to output the signal S17 as shown in FIG. 6.

Subsequently, the NAND gate Nand11 of the logic driver 234 NANDs the output signal S16 from the first comparator Comp11, the output signal S17 from the second comparator Comp12 and the clock signal Cs and outputs the NANDed result as the first drive control signal Sh. This first drive control signal Sh is generated depending on the first voltage Vo from the integrator 231 in a phase of the triangle-wave oscillation signal Sk where the triangle-wave oscillation signal Sk is lower in level than the second reference voltage Vref2.

Next, the operation of the phase shift driver 235 will be described with reference to FIGS. 5 and 6.

With reference to FIG. 5, first, the first comparator Comp21 of the phase shift driver 235 receives the triangle-wave oscillation signal Sk at its non-inverting terminal and the second reference voltage Vref2 at its inverting terminal and compares the triangle-wave oscillation signal Sk with the second reference voltage Vref2 to output the signal S12 as shown in FIG. 6.

The subtractor Sub of the phase shift driver 235 receives the second reference voltage Vref2 at its non-inverting terminal and the first voltage Vo from the integrator 231 at its inverting terminal, subtracts the first voltage Vo from the integrator 231 from the voltage 2Vref2 of twice the second reference voltage Vref2 and outputs the subtracted result as the second voltage 2Vref2-Vo. That is, the output voltage 2Vref2-Vo from the subtractor Sub is a level-shifted voltage whose level is in symmetrical relation to the level of the first voltage Vo from the integrator 231 about the level of the second reference voltage Vref2.

The second comparator Comp22 of the phase shift driver 235 receives the triangle-wave oscillation signal Sk at its non-inverting terminal and the output signal from the subtractor Sub at its inverting terminal and compares the triangle-wave oscillation signal Sk with the output signal from the subtractor Sub to output the signal S13 as shown in FIG. 6.

Subsequently, the NAND gate Nand21 of the phase shift driver 235 NANDs the output signal S12 from the first comparator Comp21, the output signal S13 from the second comparator Comp22 and the inverted clock signal Cr and outputs the NANDed result as the second drive control signal Sg. This second drive control signal Sg is generated depending on the second voltage 2Vref2-Vo from the subtractor Sub in a phase of the triangle-wave oscillation signal Sk where the triangle-wave oscillation signal Sk is higher in level than the second reference voltage Vref2.

In this manner, the logic driver 234 and the phase shift driver 235 output the first drive control signal Sh and the second drive control signal Sg as shown in FIG. 6 using the first voltage Vo from the integrator 231, respectively. Consequently, the first drive control signal Sh and the second drive control signal Sg can be adjusted in their duty cycles depending on the level of the first voltage Vo from the integrator 231. For example, the lower the level of the first voltage Vo from the integrator 231 becomes, the higher the duty cycles of the first drive control signal Sh and second drive control signal Sg become.

On the other hand, with reference to FIGS. 2 and 7, the dead time between the pair of first switching signals Sc and Sd and the dead time between the pair of second switching signals Sf and Se prevent the switching device 260 from being shorted, so that the switching device 260 can perform a stable switching operation.

In other words, the first output unit 240 outputs the pair of first switching signals Sc and Sd as shown in FIG. 7 to the first and second power switches SW1 and SW2 of the switching device 260 in response to the first drive control signal Sh to turn them on/off. At this time, the dead time is settled between the first switching signals Sc and Sd to prevent the first and second power switches SW1 and SW2 from being simultaneously turned on in an ON/OFF transition period. Similarly, the second output unit 250 outputs the pair of second switching signals Se and Sf as shown in FIG. 7 to the third and fourth power switches SW3 and SW4 of the switching device 260 in response to the second drive control signal Sg to turn them on/off. At this time, the dead time is settled between the second switching signals Se and Sf to prevent the third and fourth power switches SW3 and SW4 from being simultaneously turned on in an ON/OFF transition period.

Therefore, the zero-voltage switching can be realized when an AC voltage to the transformer 270 in FIG. 2 is inverted in level.

As apparent from the above description, the present invention provides a single-stage backlight inverter and a method for driving the same, wherein switching signals to power switches for driving of a CCFL are phase-shifted to realize zero-voltage switching capable of adjusting the ratio of enable times of the power switches. Therefore, it is possible to reduce stresses on the power switches, readily control driving of the lamp and provide a switching control circuit in the form of an IC to simplify the configuration thereof.

In other words, an AC voltage is applied to a transformer through a combination of the power switches to drive the CCFL. Therefore, it is possible to remove a buck converter and self-oscillating circuit, resulting in significant reductions in application costs and system volume. In addition, an associated control circuit is so simple that it can be, very advantageously, built in one IC. Furthermore, phase shift dimming and PWM dimming can be implemented in a simple manner, thereby making it easy to configure associated circuits and making it possible to adjust brightness of the CCFL over a wide range.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A single-stage backlight inverter for driving one lamp through one transformer using a predetermined pulse width modulation (PWM) oscillation signal, comprising:

a main oscillator for generating a predetermined triangle-wave oscillation signal, a predetermined clock signal and an inverted clock signal;

an output drive controller responsive to said triangle-wave oscillation signal, clock signal and inverted clock signal from said main oscillator and first and second reference voltages set therein, said second reference voltage having a level set to an intermediate level of said triangle-wave oscillation signal, said output drive controller generating a first voltage having a level set to a value between the level of said second reference voltage and a lowest level of said triangle-wave oscillation signal, comparing the generated first voltage with said triangle-wave oscillation signal, generating a first drive control signal in accordance with the comparison result, generating a second voltage having a level set to a value between said level of said second reference voltage and a peak level of said triangle-wave oscillation signal, comparing the generated second voltage with said triangle-wave oscillation signal, and generating a second drive control signal in accordance with the comparison result, said first and second drive control signals having different switching ON times;

a first output unit for outputting a pair of first switching signals in response to said first drive control signal from said output drive controller, said first switching signals having a predetermined dead time therebetween; and a second output unit for outputting a pair of second switching signals in response to said second drive control signal from said output drive controller, said second switching signals having a predetermined dead time therebetween.

2. The single-stage backlight inverter as set forth in claim 1, wherein said output drive controller includes:

an integrator having an inverting terminal for receiving a voltage detected from said lamp and a non-inverting terminal for receiving said first reference voltage, said integrator integrating the detected voltage to output said first voltage;

a comparison circuit having a non-inverting terminal for receiving a PWM dimming voltage and an inverting terminal for receiving said PWM oscillation signal, said comparison circuit comparing said PWM oscillation signal with said PWM dimming voltage;

a switch for performing a switching operation for connection/disconnection between an output terminal of said integrator and a ground terminal in response to an output signal from said comparison circuit;

a logic driver for generating said first drive control signal in response to said triangle-wave oscillation signal, said second reference voltage, said first voltage from said integrator and said clock signal; and a phase shift driver for generating said second drive control signal in response to said triangle-wave oscillation signal, said second reference voltage, said first voltage from said integrator and said inverted clock signal.

3. The single-stage backlight inverter as set forth in claim 2, wherein said first voltage from said integrator has a level set to an approximately intermediate value between said level of said second reference voltage and said lowest level of said triangle-wave oscillation signal.

4. The single-stage backlight inverter as set forth in claim 2, wherein said logic driver includes:

a first comparator having an inverting terminal for receiving said triangle-wave oscillation signal and a non-inverting terminal for receiving said first voltage from said integrator, said first comparator comparing said triangle-wave oscillation signal with said first voltage from said integrator;

a second comparator having an inverting terminal for receiving said triangle-wave oscillation signal and a non-inverting terminal for receiving said second reference voltage, said second comparator comparing said triangle-wave oscillation signal with said second reference voltage; and a NAND gate for NANDing an output signal from said first comparator, an output signal from said second comparator and said clock signal and outputting the NANDed result as said first drive control signal.

5. The single-stage backlight inverter as set forth in claim 2, wherein said phase shift driver includes:

a first comparator having a non-inverting terminal for receiving said triangle-wave oscillation signal and an inverting terminal for receiving said second reference voltage, said first comparator comparing said triangle-wave oscillation signal with said second reference voltage;

a subtractor having a non-inverting terminal for receiving said second reference voltage and an inverting terminal for receiving said first voltage from said integrator, said subtractor subtracting said first voltage from said integrator from a voltage of twice said second reference voltage and outputting the subtracted result as said second voltage;

a second comparator having a non-inverting terminal for receiving said triangle-wave oscillation signal and an inverting terminal for receiving an output signal from said subtractor, said second comparator comparing said triangle-wave oscillation signal with the output signal from said subtractor; and a NAND gate for NANDing an output signal from said first comparator, an output signal from said second comparator and said inverted clock signal and outputting the NANDed result as said second drive control signal.

6. The single-stage backlight inverter as set forth in claim 5, wherein said second voltage from said subtractor has a level set to an approximately intermediate value between said level of said second reference voltage and said peak level of said triangle-wave oscillation signal.

7. The single-stage backlight inverter as set forth in claim 6, wherein said level of said second voltage from said subtractor is in symmetrical relation to said level of said first voltage from said integrator about said level of said second reference voltage.

8. A method for driving a single-stage backlight inverter, said inverter driving one lamp through one transformer, said method comprising the steps of:

a) generating a triangle-wave oscillation signal, a clock signal and an inverted clock signal;

b) internally setting first and second reference voltages, said second reference voltage having a level set to an intermediate level of said triangle-wave oscillation signal;

c) generating first and second voltages, said first voltage having a level set to a value between the level of said second reference voltage and a lowest level of said triangle-wave oscillation signal, said second voltage having a level set to a value between said level of said second reference voltage and a peak level of said triangle-wave oscillation signal;

d) comparing said first voltage with said triangle-wave oscillation signal, generating a first drive control signal in accordance with the comparison result, comparing said second voltage with said triangle-wave oscillation signal and generating a second drive control signal in accordance with the comparison result;

e) generating a pair of first switching signals in response to said first drive control signal and a pair of second switching signals in response to said second drive control signal, respectively, said first switching signals having a predetermined dead time therebetween, said second switching signals having a predetermined dead time therebetween; and f) performing switching operations based on said first switching signals and said second switching signals to supply a drive signal to said lamp.

* * * * *